United States Patent [19]
Null

[11] 3,839,940
[45] Oct. 8, 1974

[54] AUTOMATIC POP-UP DECOY
[75] Inventor: Fay E. Null, Shalimar, Fla.
[73] Assignee: The United States of America as represented by the Secretary of the Air Force, Washington, D.C.
[22] Filed: Dec. 13, 1963
[21] Appl. No.: 330,507

[52] U.S. Cl............................. 89/1.5 F, 89/1.5 H
[51] Int. Cl............................................. B64d 1/04
[58] Field of Search............ 102/93, 94, 49, 50, 61, 102/5, 34.4, 37.6; 89/1.5, 1.7; 343/18; 244/137

[56] References Cited
UNITED STATES PATENTS
| | | | |
|---|---|---|---|
| 1,539,027 | 5/1925 | Stone | 89/1.3 |
| 3,094,896 | 6/1963 | Carson, Jr. et al. | 89/1.7 B |
| 3,107,617 | 10/1963 | Loeper et al. | 102/61 |
| 3,150,848 | 9/1964 | Lager | 102/34.4 X |

*Primary Examiner*—Samuel W. Engle
*Attorney, Agent, or Firm*—Harry A. Herbert, Jr.; Sherman H. Goldman

EXEMPLARY CLAIM

6. An apparatus for ejecting a decoy from an airborne vehicle in a vertical, upward direction comprising, a cell vertically oriented with respect to the longitudinal axis of said vehicle and of a shape to accommodate a decoy missile with its longitudinal axis horizontal and aligned with the line of flight of said vehicle, a sabot shaped to conform to the horizontal cross-section of said cell, said sabot having its upper surface shaped to engage said decoy missile, a hollow piston fixed to the undersurface of said sabot, a hollow ejector cylinder mounted on the base of said cell on the vertical axis thereof, said cylinder being adapted to receive said piston, a propellant within said cylinder below said piston, and means for igniting said propellant to generate a gas to force said piston, attached sabot, and decoy missile upwardly with high velocity, the piston-sabot assembly separating from said decoy missile by the difference in drag between the assembly and decoy missile.

6 Claims, 4 Drawing Figures

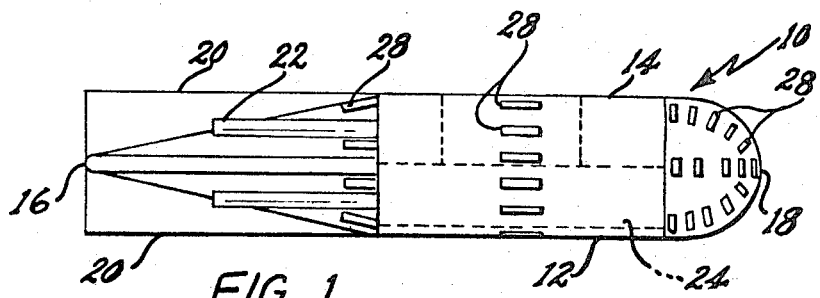
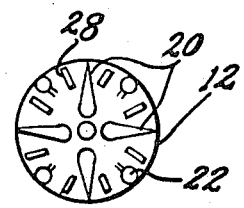
FIG. 1  FIG. 2
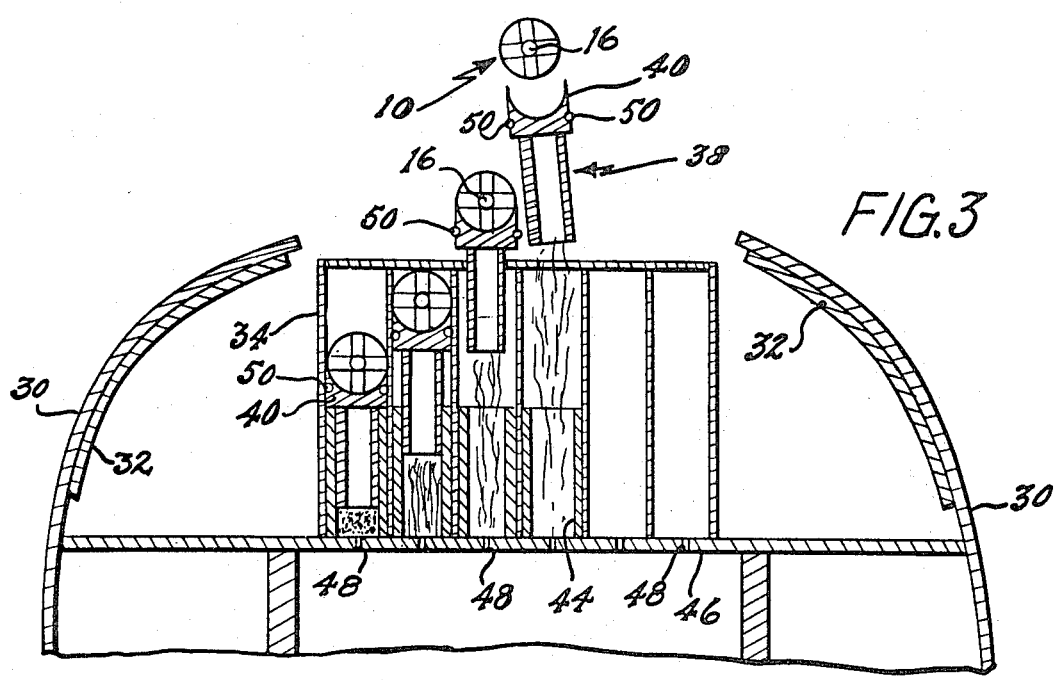
FIG. 3
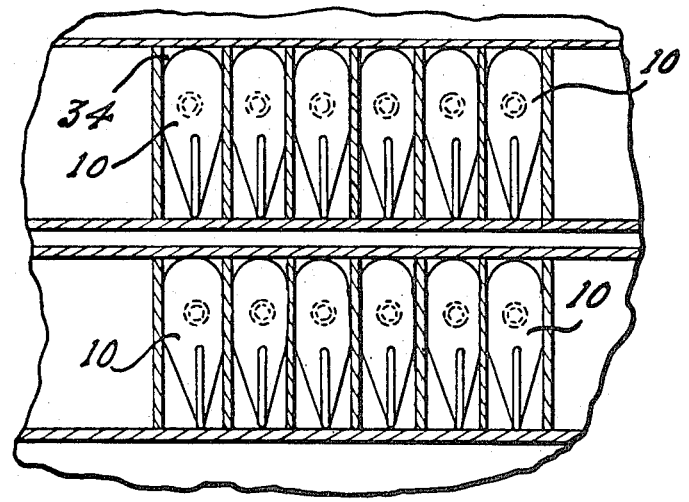
FIG. 4

AUTOMATIC POP-UP DECOY

The invention described herein may be manufactured and used by or for the United States Government for governmental purposes without payment to me of any royalty thereon.

This invention relates generally to an apparatus capable of destroying attack missiles launched against aircraft at low altitude and, more particularly, to aircraft or drone carried apparatus for vertically ejecting decoys.

With jungle and guerrilla type warfare the terrain is usually such that it is not possible for attack aircraft to see or be seen by ground troops until the aircraft is within 500 feet of the enemy. Under these conditions, an enemy launched missile, to obtain interception in the nose-on approach, requires a launch time of approximately 1 second; which normally is unattainable; however, adequate time is provided for launching a missile if advance warning is provided to the ground forces such that the missile might be launched at the instant the aircraft enters the field of view. Because of the high speeds involved to provide effective protection, it is necessary to provide decoys having a high velocity which are launched at the instant the enemy missile firing flip is picked up by the search-warning fire control system. It is contemplated that small arms fire will be minimized by conventional methods of warfare such as strafing from the aircraft.

The pop-up type decoy of this invention is ejected vertically upwardly at a high speed in order to steal the enemy tracking gate to produce a miss distance of approximately 80 feet when a 500 foot sighting distance is utilized.

Accordingly, it is an object of this invention to provide a decoy apparatus which is fired immediately upon detection of an enemy missile rocket flip.

It is another object of this invention to provide a decoy having a very high upward velocity which is capable of quickly stealing the field of view of the enemy's seeker from the aircraft it is to protect.

It is still another object of this invention to provide a high diversion velocity decoy projecting apparatus which utilizes very long firing cylinders and one shot, free piston-sabots.

It is a further object of this invention to provide a decoy launching device which is capable of repeated reloading and firing.

It is a still further object of this invention to provide a high diversion velocity decoy apparatus which may be easily manufactured of conventional, currently available materials that lend themselves to standard mass production manufacturing techniques.

These and other advantages, features and objects of the invention will become more apparent from the following description taken in connection with the illustrative embodiments in the accompanying drawings, wherein:

FIG. 1 is a front view of a decoy having infrared flares and a traveling wave repeater;

FIG. 2 is an end view looking at the tail or fin end of FIG. 1;

FIG. 3 is a partially schematic cross-sectional view in elevation of a high velocity ejector capable of ejecting the decoys of the type illustrated in FIG. 1; and FIG. 4 is a top view of the ejector system illustrated in FIG. 3 which portrays two banks of ejectors.

Referring to FIGS. 1 and 2, there is shown a decoy which is to be ejected from an aircraft or a drone in order to mislead an enemy missile. It is contemplated that the unit could be built with a length of 27 inches and an outside diameter of approximately 6 inches with a weight of approximately 35 pounds. The decoy unit, indicated at 10, is comprised of an outer shell or casing 12 which is tapered from a cylindrical body portion 14 to approach a point at the tail portion 16. The forward portion of casing 12, indicated at 18, could be rounded or of ogival shape. Fins are provided at the tail portion of the decoy 10, four of which are shown and designated with the numeral 20. Emanating from within the cylindrical portion 14 and supported by the tapered portion 16 of the decoy are a series of tubes 22, one of which is located between each adjacent pair of fins. The units 22 are infrared flares and may be of any conventional construction. It is contemplated that an output of 20,000 watts/steradion will perform the infrared decoy function. The decoy 10 has contained therein a traveling wave tube 24 which is capable of providing 50 d.b. amplifications with an output of 10 watts in the X-band in order to supply the diversionary radar signal. A power supply 26 is also provided within the body of the decoy in order to activate both the flares 20 and the traveling wave tube 24. Antenna radiators 28 are provided on the front portion 18 of the decoy, the center portion 14 and the tapered rear portion 16 in order to provide complete antenna coverage for the decoy.

The decoy unit shown in FIGS. 1 and 2, in order to be effective, is required to be projected from an aircraft or drone with an ejection velocity of approximately 161 feet per second. When the decoy is ejected it will weather cock into the relative wind and have a drag of about 8 pounds. Thus, with the initial ejection velocity, as stated, the decoy will continue to rise for approximately 5 seconds with only a small decrease in forward velocity in this length of time. In order to produce an ejector which will meet the requirements for ejecting the decoy the apparatus of FIGS. 3 and 4 was developed.

In these Figures, 30 represents the fuselage of an aircraft or drone with rotary doors 32, shown in the "open position," providing a ceiling for the bomb bay in order to allow for upward launch. The ejector unit for each decoy comprises an ejector cell 34 which is shaped to accommodate decoy 10 in a horizontal position in the aircraft. Of course, a series of cells, as shown, would be provided; however, the description which follows will be related to a single cell. Each cell 34 is several feet in height so that the ejection velocities of 161 feet per second can be reached with normal rocket tube pressures. Because of the lack of symmetry of the ends of the decoy 10 a piston-sabot is provided to engage decoy 10 with its engaging portion 40 formed to fit the missile. Behind the engagement portion 40 is a hollow cylinder 38 which is adapted to engage with any ejector cylinder 44 which is located within the ejector cell 34. When the piston-sabot is inserted within the cylinder 44, a space at the bottom is provided for propellant and the base 46 of the ejector cell would have conventional firing squibs 48 located beneath the propellant such that it acts as an igniter powerful enough to reduce the delay in development of propellant gas pressure to a minimum. Once the propellant gas is generated the piston-sabot is forced upwardly taking with it the decoy 10. Ball bearings 50 may be provided in the cell or sabot portion 40 in order to eliminate drag during ejection. In FIG. 4, a top view of FIG. 3 with the bomb bay rotary doors open, a pair of rows of cells may be provided, the particular arrangement of cells not being critical.

Assuming that the aircraft is on a mission and is strafing in order to minimize damage from small arms fire, and also assuming that there has been warning to the enemy on the ground such that he has the capability of launching a missile immediately upon the sighting of the aircraft which, for the purpose of this design, is calculated to be approximately 500 feet, a missile would be launched by the enemy. Immediately upon detection of the enemy missile rocket flip, the decoy is fired upwardly and at the same time the traveling wave tube and infrared flares would be energized, the traveling wave tube supplying the diversionary radar signals while the infrared flares provide a greater output than that of the aircraft for this type of missile operation. The unusually high upward velocity provided by the long ejector cells allows for the quick stealing of the field of view of the enemy missile from the aircraft it is to protect in order quickly to establish the enemy missile on a false course of flight. After the 5 second interval of upward velocity, because of the low drag of the decoy, it would be traveling close to the initial forward velocity of the aircraft while the piston-sabot follows behind the aircraft. Streamlining of the decoy is necessary in order that it may match closely to the speed of the carrier aircraft thereby making difficult the discrimination by the enemy seeker system.

A single shot piston-sabot is necessary in order to achieve the high velocities required in utilizing the foregoing strategy. The quick loss of forward velocity of the piston-sabot allows it to clear the decoy unit and the aircraft or drone.

Greater protection of an attacking aircraft would be provided if a drone were to accompany master aircraft with the drone having the decoy units therein. When this system is utilized, the master aircraft could be flown a slight distance laterally of the drone in order to avoid interferences by the piston-sabot.

Thus there has been provided a novel ejector system with a decoy which provides protection for attack aircraft and drones greater than that which has been heretofore achieved.

Although the invention has been described with reference to a particular embodiment, it will be understood to those skilled in the art that the invention is capable of a variety of alternative embodiments within the spirit and scope of the appended claims.

I claim:

1. An apparatus for ejecting a decoy from an airborne vehicle in a vertical, upward direction comprising, a cell vertically oriented with respect to the longitudinal axis of said vehicle and of a shape to accommodate a decoy missile with its longitudinal axis horizontal and aligned with the line of flight of said vehicle, a sabot shaped to conform to the horizontal cross-section of said cell, said sabot having its upper surface shaped to engage said decoy missile, a piston fixed to the undersurface of said sabot, an ejector cylinder mounted on the base of said cell, said cylinder being adapted to receive said piston, a propellant within said cylinder below said piston, and means for igniting said propellant to generate a gas to force said piston, attached sabot, and decoy missile upwardly with high velocity.

2. An apparatus as defined in claim 1 including infrared flares on said decoy missile.

3. An apparatus as defined in claim 1 including means mounted in said decoy missile for providing a diversionary radar signal.

4. An apparatus for ejecting a decoy from an airborne vehicle in a vertical, upward direction comprising, a cell vertically oriented with respect to the longitudinal axis of said vehicle and of a shape to accommodate a decoy missile with its longitudinal axis horizontal and aligned with the line of flight of said vehicle, a sabot shaped to conform to the horizontal cross-section of said cell, said sabot having its upper surface shaped to engage said decoy missile, a piston fixed to the undersurface of said sabot, a hollow ejector cylinder mounted on the base of said cell on the vertical axis thereof, said cylinder being adapted to receive said piston, a propellant within said cylinder below said piston, and means for igniting said propellant to generate a gas to force said piston, attached sabot, and decoy missile upwardly with high velocity.

5. An apparatus as defined in claim 4 including ball bearing means between said sabot and said cell for minimizing friction therebetween.

6. An apparatus for ejecting a decoy from an airborne vehicle in a vertical, upward direction comprising, a cell vertically oriented with respect to the longitudinal axis of said vehicle and of a shape to accommodate a decoy missile with its longitudinal axis horizontal and aligned with the line of flight of said vehicle, a sabot shaped to conform to the horizontal cross-section of said cell, said sabot having its upper surface shaped to engage said decoy missile, a hollow piston fixed to the undersurface of said sabot, a hollow ejector cylinder mounted on the base of said cell on the vertical axis thereof, said cylinder being adapted to receive said piston, a propellant within said cylinder below said piston, and means for igniting said propellant to generate a gas to force said piston, attached sabot, and decoy missile upwardly with high velocity, the piston-sabot assembly separating from said decoy missile by the difference in drag between the assembly and decoy missile.

* * * * *